United States Patent [19]

Schabereiter et al.

[11] Patent Number: 4,468,250

[45] Date of Patent: Aug. 28, 1984

[54] WELDING ADDITIVE MATERIAL SUBSTANTIALLY FREE OF COBALT AND CARBIDE FOR DEPOSIT WELDING

[75] Inventors: Heinz Schabereiter, Kapfenberg; Josef Tösch, Bruck an der Mur, both of Austria

[73] Assignee: Vereinigte Edelstahlwerke AG, Vienna, Austria

[21] Appl. No.: 463,139

[22] Filed: Feb. 2, 1983

[30] Foreign Application Priority Data

Feb. 19, 1982 [AT] Austria .................................. 637/82

[51] Int. Cl.³ ............................................. C22C 38/04
[52] U.S. Cl. .............................. 75/128 A; 75/128 C; 228/263.11; 219/146.23
[58] Field of Search ......................... 75/128 A, 128 C; 219/146.1, 146.21, 146.23, 146.31, 146.32, 219/146.41, 146.52; 228/263.11, 263.15, 263.16; 428/685; 420/584, 583; 148/442, 419

[56] References Cited

U.S. PATENT DOCUMENTS 593,834 3/1960 Linnert et al. .................... 75/128 A
3,615,368 10/1971 Baumel ............................. 75/128 A

FOREIGN PATENT DOCUMENTS 298930 5/1972 Austria .
53-63209 6/1978 Japan ................................ 75/128 C
525059 7/1972 Switzerland .

*Primary Examiner*—L. Dewayne Rutledge
*Assistant Examiner*—Debbie Yee
*Attorney, Agent, or Firm*—Werner W. Kleeman

[57] ABSTRACT

A welding additive material substantially free of cobalt and carbide for deposit welding to obtain a welding deposit having high abrasion resistance, high corrosion resistance and high inter-granular corrosion resistance in the non-heat treated state, essentially consists of carbon up to a maximum of 0.15 percent, silicon in the range 3.00 to 10.00 percent, manganese in the range of 3.00 to 12.00 percent, chromium in the range of 22.00 to 30.00 percent and nickel in the range of 7.00 to 16.00 percent, each in percent by weight related to the proportion of the metallic components contained in the core wire and in the coating of a coated rod electrode or the filler of a filler wire of band filler. The remainder may be iron and unavoidable impurities.

5 Claims, No Drawings

WELDING ADDITIVE MATERIAL SUBSTANTIALLY FREE OF COBALT AND CARBIDE FOR DEPOSIT WELDING

BACKGROUND OF THE INVENTION

The present invention relates to a new and improved welding additive material substantially free of cobalt and carbide for deposit welding, in order to obtain a weld possessing high wear or abrasion resistance, high corrosion resistance and high inter-granular corrosion resistance.

Heretofore cobalt-based alloys have been predominantly employed for producing deposit welds which possess resistance to high frictional wear and which also possess high corrosion resistance.

A carbide-free welding additive material for deposit welding as known, for example, from German Pat. No. 2,446,517 consists of a nickel alloy containing in the range of 25–50 percent by weight of chromium, 1–5 percent by weight of silicon, and 0.5–3 percent by weight of boron. The chromium content is set in a defined ratio to the boron content.

There are fields of application for these two types of known welding additive materials in which these welding additive materials can hardly or not at all be taken into consideration. With respect to the first mentioned group this is true for components used in nuclear steam generating systems because, due to the cobalt content thereof, the maintenance and repair operations are tremendously aggravated by the high radiation exposure.

OBJECTS OF THE INVENTION

Therefore, with the foregoing in mind it is a primary object of the present invention to provide a new and improved welding additive material which is not subject to the aforementioned drawbacks and limitations heretofore discussed.

Another and more specific object of the present invention is directed to the provision of a new and improved welding additive material which has a wider range of application in welding practice.

Still a further significant object of the present invention is directed to a new and improved welding additive material for deposit welding which is substantially free of cobalt and carbide.

Another significant object of the present invention is directed to the provision of a new and improved welding additive material for deposit welding which yields a welding deposit or weld which has high abrasion or wear resistance, high corrosion resistance and high inter-granular corrosion resistance in the non-heat treated state.

DETAILED DESCRIPTION OF THE INVENTION

Now in order to implement these and still further objects of the invention, which will become more readily apparent as the description proceeds, the welding additive material of the present development is manifested by the features that, the welding additive material comprises carbon up to a maximum of 0.15 percent, silicon in the range of 3.0–10.0 percent, manganese in the range of 3.0 to 12.0 percent, chromium in the range of 22.0–30.0 percent, and nickel in the range of 7.0–16.0 percent, each in percent by weight related to the proportion of metal contained in a core wire and coating of a coated rod electrode, or, respectively, in a filler and the casing of a filler wire or band; the remainder being composed of iron and unavoidable impurities.

Surprisingly it has been found that a welding additive material can be formed on the basis of a chromium-nickel-steel alloy which, in many cases, can be successfully substituted for deposit welding alloys formed on the basis of cobalt.

According to a preferred embodiment, the welding additive material according to the invention comprises carbon up to a maximum of 0.15 percent, silicon in the range of 4.5–8.5 percent, manganese in the range of 5.5–12.0 percent, chromium in the range of 22.0–27.0 percent, and nickel in the range of 7.0–14.0 percent, each in percent by weight of the proportion of metal contained in said core wire and said coating or, respectively, said filler, the remainder being composed of iron and unavoidable impurities.

With respect to the unintentional impurities present, it is to be noted that such an impurity may be understood in some cases, which depend upon the nature of the raw materials employed, to be constituted by a minimum amount of cobalt. It will be self-evident, however, that efforts will be made to limit such impurity to the smallest possible extent, in any case, to lower than 0.25 percent by weight of cobalt.

The welding deposit obtained by using rod electrodes, preferably having a basic coating or correspondingly designed filler wires or filler bands according to the invention, respectively, have a ferritic-austenitic structure containing 40–70 percent ferrite. The good tribologic properties thereof can be attributed to the high ferrite proportion and to the silicon content. The hardness of the welding deposit can be assumed to be about 300 HV 10 in the preferred embodiment of the welding additive material.

The invention will be still better understood and objects other than those set forth above, will become apparent when consideration is given to the following detailed examples. The percentages given herein are all in percent by weight unless otherwise specifically indicated.

EXAMPLE 1:

Medium coated rod electrodes were manufactured, the rod electrodes each comprised a core wire composed of 0.10 percent carbon, 4.6 percent silicon, 1.01 percent manganese, 19.5 percent chromium, and 12.0 percent nickel, the remainder being iron and unavoidable impurities, and also each comprised a coating constituted by a coating material, the percent by weight composition thereof in the dry state being:

| | |
|---|---|
| Calcium carbonate ($CaCo_3$) | 22 |
| Calcium fluoride ($CaF_2$) | 18 |
| Metallic manganese | 18 |
| Metallic chromium | 20 |
| FeSi containing 45 percent silicon | 11 and |
| Silicate binder including pressing additive | 11 |

Using such rod electrode a 3-layered deposit weld was formed wherein a pre-warming or, respectively, intermediate layer temperature a more than 250° C. was observed. The composition of the welding deposit was determined in accordance with German Industrial Standard 8556 and amounted to: carbon 0.12 percent, silicon 5.7 percent, manganese 5.6 percent, chromium 22.3 percent, and nickel 9.1 percent, the remainder substantially being iron. The hardness of the welding deposit was determined to be 320 HV 10.

During a comparative investigation the wear properties were compared to those obtained using a welding additive material formed on the basis of cobalt. Therefore, frictional wear was investigated at room temperature and in a high temperature frictional test apparatus at 280° C. Plain parallel ground welding deposit surfaces were subjected to mutually oscillating frictional movements under various loads in an aqueous medium (demineralized water), and it was surprisingly found that the welding deposit obtained according to the invention possessed approximately the same good results as obtained when using a cobalt alloy. The composition of the cobalt alloy was: cobalt 65 percent, chromium 25 percent, tungsten 4.5 percent, and carbon 1.2 percent, the remainder being substantially iron. The inter-granular corrosion resistance was investigated in accordance with the specifications given in German Industrial Standard 50914 valid for welding additive materials. Therefor, welding samples obtained from a 4-layered deposit weld were boiled in a copper sulphate solution containing sulphuric acid for 15 hours. Metallographic investigation of the samples of the pure welding deposit thus obtained revealed no inter-granular attack.

EXAMPLE 2:

A filler wire was produced from a chromium steel band measuring 12.7×0.3 mm and having the following composition: carbon 0.08 percent, silicon 0.5 percent, manganese 1.0 percent, and chromium 17.0 percent, the remainder being iron and unavoidable impurities. The filling material or filler was composed of 31 percent FeSi containing 45 percent silicon, 26 percent FeCr containing 70 percent chromium, 22 percent nickel and 21 percent FeMn containing 80 percent manganese. The final diameter of the filler wire was 3.2 mm. Deposit weldings or welds were produced in an inert gas atmosphere. As in the case of Example 1 comparative investigations carried out with the welding deposit thus obtained showed that the welding deposits formed using the filler wire possessed similarly good comparative values as the welding deposit obtained with the cobalt alloy with respect to the tribologic properties as well as with respect to the inter-granular corrosion resistance.

While there have been described present preferred embodiments of the invention, it is to be distinctly understood that the invention is not limited thereto, but may be otherwise variously embodied and practiced within the scope of the following claims. Accordingly,

What we claim is:

1. An essentially cobalt and carbide free additive material for deposit welding and forming an additive welding member having metallic and non-metallic components in order to obtain a welding deposit having high abrasion resistance, high corrosion resistance and high inter-granular corrosion resistance in a non-heat treated state, said additive material of said additive welding member related solely to the metallic components thereof consisting essentially of
 carbon up to a maximum of 0.15 percent,
 silicon in the range of 3.0–10.0 percent,
 manganese in the range of 3.0–12.0 percent,
 chromium in the range of 22.0–30.0 percent, and
 nickel in the range of 7.0–16.0 percent,
each in percent by weight, and the remainder being composed of iron and unavoidable impurities; and
 said additive material of said additive welding member yielding a welding deposit having a ferritic-austenitic structure containing ferrite in the range of 40 to 70 percent by weight.

2. The additive material for deposit welding as defined in claim 1, wherein:
 said additive material forms a coated rod electrode.

3. The additive material for deposit welding as defined in claim 1, wherein:
 said additive material forms a filler wire.

4. The additive material for deposit welding as defined in claim 1, wherein:
 said additive material forms a filler band.

5. The additive material for deposit welding as defined in claim 1, consisting essentially of:
 carbon up to a maximum of 0.15 percent,
 silicon in the range of 4.5–8.5 percent,
 manganese in the range of 5.5–12.0 percent,
 chromium in the range of 22.0–27.0 percent, and
 nickel in the range of 7.0–14.0 percent,
each in percent by weight; and
 the remainder being composed of iron and unavoidable impurities.

* * * * *